United States Patent

Grover

[15] 3,655,247
[45] Apr. 11, 1972

[54] RECIRCULATING BEARING

[72] Inventor: Robert Raymond Grover, R.F.D. #1, Winchester, N.H. 03470

[22] Filed: Feb. 26, 1970

[21] Appl. No.: 14,447

[52] U.S. Cl. .................................................308/6 C
[51] Int. Cl. .................................................F16c 29/06
[58] Field of Search .....................................308/6 C

[56] References Cited

UNITED STATES PATENTS

| 3,003,828 | 10/1961 | Stark | 308/6 C |
| 3,190,703 | 6/1965 | Thomson et al | 308/6 C |
| 3,341,262 | 9/1967 | Kalmanek | 308/6 C |
| 3,410,614 | 11/1968 | Shaw | 308/6 C |
| 3,466,101 | 9/1969 | Hudson | 308/6 C |

Primary Examiner—Martin P. Schwadron
Assistant Examiner—Barry Grossman
Attorney—Diller, Brown, Ramik & Holt

[57] ABSTRACT

A recirculating anti-friction bearing having a cylindrical race body floatingly mounted on roller members which have an annular radial concave recess centrally thereof thereby providing infinite adjustability of the race body about its axial center line.

5 Claims, 9 Drawing Figures

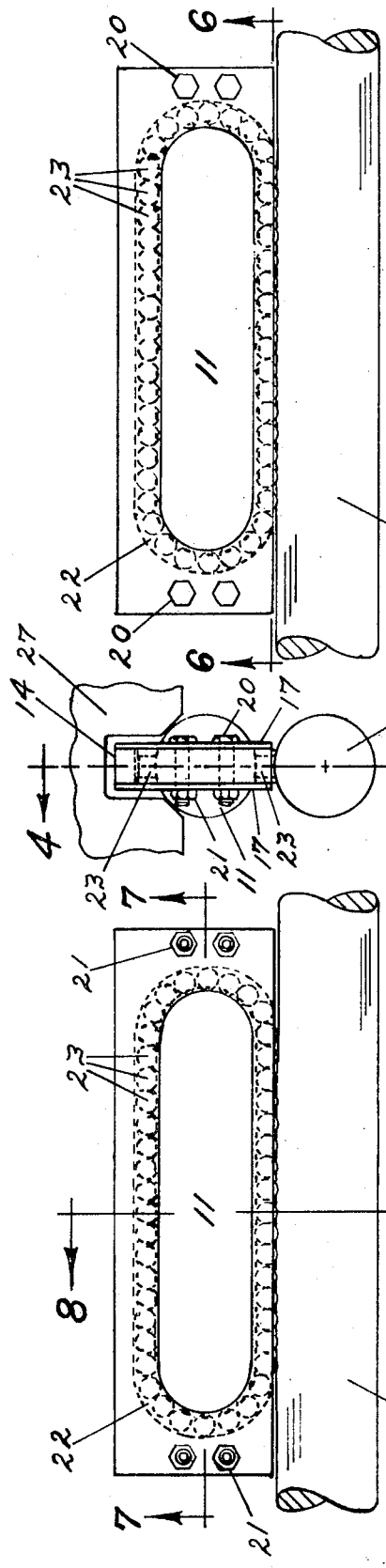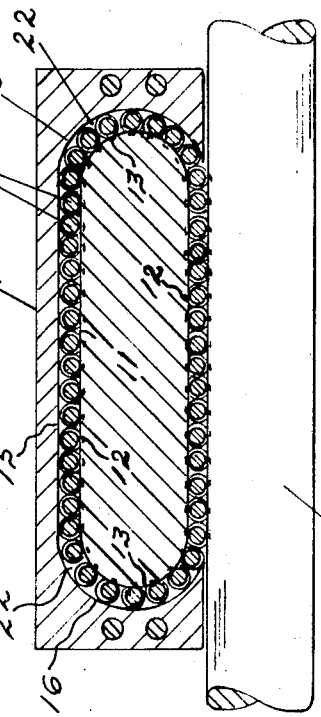

Patented April 11, 1972  3,655,247
2 Sheets-Sheet 2
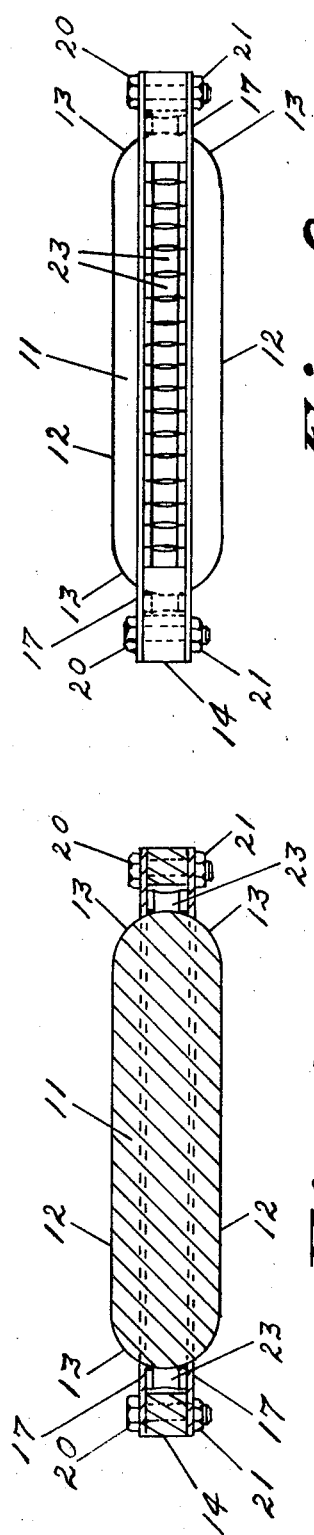
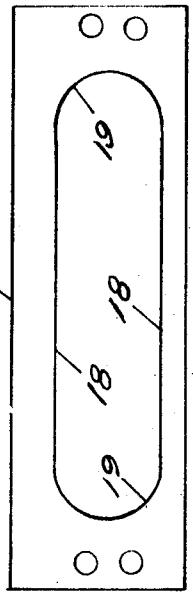
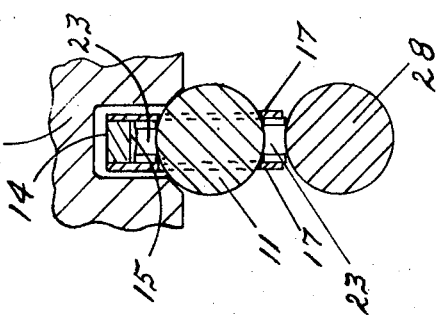
INVENTOR.
Robert R. Grover

RECIRCULATING BEARING

This invention pertains to antifriction devices and in particular to antifriction devices of the full complement recirculating type for permitting linear motion.

In the construction of grinders, milling machines, and other machines, having linearly reciprocal ways, it is necessary to provide some means for minimizing friction. In the past oil films have been used to reduce friction between the carriage and the bed. This has been unsatisfactory because of variation in the physical properties of the lubricant. For example, changes in viscosity of the lubricant affect the clearance. Also in certain instances a slow moving carriage will have a tendency to stick, which results in poor work. Antifriction devices, including ball and roller bearings, have also been used in an attempt to eliminate the above named problems. However, they have not proved to be wholly satisfactory.

Therefore, it is an object of the invention to provide an antifriction device of novel construction.

Another object of the invention is to provide a concave rod end type roller bearing that is simple in construction and may be economically manufactured.

Another object of the invention is to provide a concave rod end type roller antifriction device which is compact, has a high load capacity, and is non-skewing.

Still another object of the invention is to provide a concave rod end type roller antifriction device that is a self-contained unit which may be readily mounted on existing machine designs.

Other objects of the invention will be apparent upon development of the specifications with reference to the drawings.

In the drawings:

FIG. 1 is a side view in elevation of the recirculating bearing in engagement with the round way embodying the invention.

FIG. 2 is an end view in elevation of the recirculating bearing in engagement with the round way mounted in a working environment.

FIG. 3 is a side view in elevation of the recirculating bearing in engagement with the round way embodying the invention.

FIG. 4 is a side view in elevation and in section taken along the line 4—4 of FIG. 2.

FIG. 5 is an elevational view of a concave rod end type roller member forming a part of the invention.

FIG. 6 is a bottom view of the recirculating bearing taken along the line 6—6 of FIG. 1.

FIG. 7 is a sectional view taken along the line 7—7 of FIG. 3.

FIG. 8 is a sectional view taken along the line 8—8 of FIG. 3, embodying the invention mounted in a working environment.

FIG. 9 is an elevational view of a side member forming a part of the invention.

Referring now to the drawings, there is shown a full complement recirculating type bearing. The bearing may be fabricated from any suitable material, but in its preferred embodiment it is constructed of a relatively hard material such as bearing steel. Bearing steel being relatively hard, is wear resistant and thus would insure a relatively long and useful life for the bearing.

The recirculating bearing is composed of several parts, one of which is the race body 11. As best shown in FIG. 4, the race body is generally an elongated cylinder 12, cylindrical in cross section with semispherical end portions 13. The radius of the cylindrical cross section 12 and the radius of the semispherical end portions 13 of race body 11 being of the same radius to fully receive and guide the antifriction members that are used in the construction of the bearing as will be more fully explained later on. It can be seen that the race body 11 can alternately be characterized as being composed of an elongated cylindrical portion 12 with two semispherical end portions 13 arranged in a U-shaped configuration.

The return member 14 as best shown in FIG. 4, is generally rectangular in cross section for its elongated length portion 15, with end portions 16 semispherical in shape with truncated ends to provide return guides for the antifriction members that are used in this invention. The return member 14 is centrally located about the race body 11 as will be explained more fully later on.

As best shown in FIG. 9, the side member 17 has an elongated hole portion 18 with semicircular connecting ends 19 removed, to enable the race body 11 to be partially secured therein.

As best shown in FIG. 2 and FIG. 8, the side members 17 are secured to the sides of race return member 14 by bolts 20 and locknuts 21, and retain race body 11 therein in a centrally located position.

Referring to FIG. 2 and FIG. 4 and FIG. 8, it can be seen that the previously disclosed parts, when assembled, form trackways that define a generally ovate raceway 22.

As best shown in FIG. 5, the antifriction concave rod end type roller members 23, have a centrally located annular radial concave recess 24, and annular roller surfaces 25 of the same diameter, terminating in roller ends 26. The annular radial concave recess 24, of antifriction members 23, and the elongated cylindrical portion 12 of race body 11 being of the same radius for rolling engagement as will be explained more fully later on.

As best shown in FIG. 2, lowermost portions of the roller surfaces 25 extend below the lowermost edges of the side members 17 when the centrally located annular radial concave recesses 24 of the antifriction members 23 are in touching engagement with the race body 11.

The aforesaid ovate race way 22 is of sufficient width to fully receive the roller ends 26 of the antifriction concave rod end type roller members 23, that are used in this bearing, and of a sufficient depth that the said return way member 14 projects from the elongated cylindrical portion 12 and the semispherical end portions 13 of race body 11 a distance greater than the combination of the maximum radius of said annular concave radial recess 24 and the radius of said annular roller surface 25 of the antifriction members 23. Also the axial width between the roller ends 26 of antifriction members 23 is to be slightly less than the width of the return member 14 so as to hold the axes of said antifriction members 23 substantially normal to the direction of travel and freely move within the side members 17 previously mentioned. The purpose of the roller ends 26 of antifriction members 23 is to position and guide the antifriction members 23 so that their rolling axes are perpendicular to the direction of travel. If the antifriction members 23 were permitted to skew, obviously there would be rubbing motion as well as a rolling motion between them and the adjacent surface. Thus friction would be high and the life of the antifriction members 23 would be decreased by wear incurred through the rubbing motion.

In FIG. 2 and FIG. 8, the bearing embodying the invention is shown as being mounted such that the race body 11 is in tangential touching relationship with spaced surfaces of support 27 representing a milling table, a grinding spindle, or the like, and the bearing is movable along the round way 28 representing the machine bed way. The radius of said round way 28 and the radius of elongated portion 12 of race body 11 are of the same radius as the annular radial concave recess 24 of antifriction members 23, such that said race body 11 and said round way 28 are in parallel relationship with antifriction members 23 substantially therebetween in a spaced relationship, and the axes of antifriction members 23 are substantially normal to the direction of travel. In this instance support 27 is represented as the movable member to which is secured race body 11 by some suitable means (not shown). The centrally located annular concave recesses 24 of antifriction members 23 are in touching engagement with the radial elongated portion 12 of race body 11 and also in touching engagement with the radial portion of round way 28. Thus as the surface 27 reciprocates linearly, antifriction members 23 are rolled along the radial elongated portion 12 of race body 11 and into the return end portions 16 and raceway 22 of return member 14.

As was mentioned previously, the bearing in its preferred embodiment is fabricated from some suitable relatively hard material such as bearing steel. By using such material it may be finish ground after being fully hardened and in this manner extremely close tolerances realized.

From the foregoing description it can be seen that a simple and economical recirculating bearing has been provided. At the same time this bearing may be readily adapted to be incorporated into commercial machines, such as milling machines, grinding machines, and the like.

Although certain elements, materials, and other details have been specified, it is to be understood that these are by way of example rather than limitation, It is apparent that certain modifications may be made within the scope of the claims without departing from the spirit of the invention.

I claim:

1. A recirculating antifriction bearing comprising an elongated cylindrical race body, a plurality of roller members each having an annular radial concave recess centrally thereof, said cylindrical race body and said concave recess having the same radius of curvature for providing roller engagement therebetween, said race body being floatingly mounted on said roller members for providing infinite adjustability of said race body about its axial center line, return member means partially enclosing at least the ends of said race body and being spaced therefrom for defining a raceway therebetween, and side member means extending along said race body on opposite sides of said return member means and fixed relative to said return member means.

2. A bearing as defined in claim 1 wherein said return member means have a width slightly greater than the axial length of said roller members.

3. A bearing as defined in claim 1 wherein said side member means include a pair of flat plates each having an elongated hole portion, said flat plates being disposed parallel to each other on opposite sides of an axial center line of said race body, and said race body extending outwardly through the elongated hole portion in each of said flat plates.

4. A bearing as defined in claim 4 wherein said cylindrical race body includes hemispherical portions at each end thereof.

5. A recirculating antifriction bearing comprising an elongated cylindrical race body, a plurality of roller members each having an annular radial concave recess centrally thereof, said cylindrical race body and said concave recess having the same radius of curvature for providing rolling engagement therebetween, said race body being floatingly mounted on said roller members for providing infinite adjustability of said race body about its axial center line, and return member means partially enclosing at least the ends of said race body and being spaced therefrom for defining a raceway therebetween.

* * * * *